United States Patent
Verkama et al.

(10) Patent No.: US 7,027,417 B1
(45) Date of Patent: Apr. 11, 2006

(54) MANAGEMENT OF PACKET SWITCHED CONNECTIONS IN A MOBILE COMMUNICATIONS NETWORK

(75) Inventors: Markku Verkama, Espoo (FI); Kalle Ahmavaara, Vantaa (FI); Timo Perälä, Helsinki (FI); Jari Hartikainen, Kerava (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/510,893

(22) Filed: Feb. 23, 2000

Related U.S. Application Data

(63) Continuation of application No. PCT/FI99/00564, filed on Jun. 24, 1999.

(30) Foreign Application Priority Data

Jun. 26, 1998 (FI) .................................. 981485

(51) Int. Cl.
*H04Q 7/22* (2006.01)
(52) U.S. Cl. ....................... 370/329; 370/477
(58) Field of Classification Search ................ 370/328, 370/329, 477, 401, 402, 352, 356, 395.2, 370/395.21, 395.3, 409, 463
See application file for complete search history.

(56) References Cited

U.S. PATENT DOCUMENTS

| | | | | |
|---|---|---|---|---|
| 5,479,402 A | * | 12/1995 | Hata et al. ................. 370/397 |
| 5,664,007 A | * | 9/1997 | Samadi et al. .............. 455/442 |
| 5,708,656 A | | 1/1998 | Noneman et al. | |
| 5,745,695 A | | 4/1998 | Gilchrist et al. | |
| 6,026,297 A | * | 2/2000 | Haartsen .................. 455/426.1 |
| 6,249,681 B1 | * | 6/2001 | Virtanen ..................... 455/466 |
| 6,393,001 B1 | * | 5/2002 | Miyata ........................ 370/316 |
| 6,456,604 B1 | * | 9/2002 | Lee et al. .................... 370/328 |

FOREIGN PATENT DOCUMENTS

| | | |
|---|---|---|
| JP | 09055764 A | 2/1997 |
| WO | 97/37504 | 10/1997 |

* cited by examiner

*Primary Examiner*—Min Jung
(74) *Attorney, Agent, or Firm*—Squire, Sanders & Dempsey L.L.P.

(57) ABSTRACT

In connection-oriented switching of packet data in known mobile communications systems, resources of the transmission path between the serving node (SGSN) and the radio network subsystem (RNS) and memory resources of the radio network subsystem are reserved unnecessarily due to the burst-like nature of packet data. Thus the transmission network's limited address space and the radio network subsystem's management resources are consumed. The invention concerns such connection management in a mobile communications system, which is suitable for packet-switched data transmission. The method according to the invention is characterized in that the logical connection between the serving node (SGSN) and the radio network subsystem (RNS) is released, so that the logical connection between the serving node (SGSN) and the mobile station (MS) remains, and the released logical connection is reconnected, when relaying of user data starts.

18 Claims, 7 Drawing Sheets

MANAGEMENT OF PACKET SWITCHED CONNECTIONS IN A MOBILE COMMUNICATIONS NETWORK

This application is a continuation of international application serial number PCT/FI99/00564, filed 24 Jun. 1999.

FIELD OF THE INVENTION

The present invention concerns connection management communications system, especially in a mobile communications system suitable for packet switched data transmission.

TECHNICAL BACKGROUND

Telecommunication networks can be divided into circuit switched and packet switched networks. In circuit switched networks, the transmission connection between the transmitting party and the receiving party is reserved before starting the transmission. It is a drawback of this connection method that the transmission connection is reserved even if no information is transmitted over the connection. In packet switched networks, transmission of packets may be connection-oriented or connectionless. In connectionless packet switched networks, the transmission network is common to all users. Information is transmitted in packets which contain information on their destination. Resources of the transmission network are not reserved in advance, nor are any packets transmitted when there is no information to be transmitted. In this way no transmission network capacity is reserved unnecessarily. In the connection-oriented packet switched technology, virtual circuits are formed for certain transmission routes between network elements and every packet of the connection is routed along the same route. Thus, the information is routed as in circuit switched networks, but no transmission capacity is unnecessarily reserved. E.g. the ATM (Asynchronous Transfer Mode) network is formed with the aid of virtual circuits.

Accessing packet switched networks like the Internet is further possible in many ways. The pan-European GSM mobile communications system, which is based on time division multiple access TDMA, allows circuit switched connection to packet switched networks in a known manner, when an adaptation protocol (e.g. a point-to-point protocol, PPP) is used between the mobile station and the connection point located in the network. The GPRS service (General Packet Radio Service) defined in the GSM system also allows packet switched connection from mobile stations to packet data networks like the Internet. FIG. 1 shows the simplified structure of the GPRS network. The serving GPRS support node SGSN contains mobility management and safety functions of the mobile stations. Through the gateway GPRS support node GGSN the network transmits packet data to and receives packet data from a packet data network PDN. By way of the gateway node the GPRS network is also in connection with other networks, such as the Internet or an X.25 network. Both the gateway and the serving node contain IP routing functions. Base station subsystem BSS includes base station controller BSC and one or more base stations BS. Mobile station MS is in connection with a base station over the radio path. In addition, the network includes home location register HLR for permanent storing of subscriber information.

In the GPRS network, transmission of packets between the mobile station and the serving node is transparent from the viewpoint of the base station system, and no record relating to the mobile station's GPRS service is stored in the base station system. Instead, every serving node SGSN has context information about the mobile stations which it is serving. In the GPRS system, context information can be divided into mobility management MM and packet data protocol PDP information respectively. The mobility management will tell where the mobile station is located and in which state it is. Possible states of a mobile station registered with a GPRS system are the idle state, the standby state and the ready state. When in the idle state, the mobile station is passive and it is able to receive only the broadcast of the base stations, but no point-to-point packets can be transmitted between the mobile station and the network. In the ready state, the mobile station is able to receive packets without any call procedure. From the ready state the mobile station moves to the standby state after a certain non-activity period. From the standby state the mobile station returns to the ready state after a call from the network or for transmission of a packet. The move between idle state and active state takes place by GPRS Attach and GPRS Detach procedures. In the ready state, the network knows the location of the mobile station with one-cell precision. Each packet to the mobile station is routed individually with the aid of a cell identifier attached to the packet from the serving node to the correct base station. Thus, user information is transmitted between the network and the mobile station without any connection assigned between the base station system and the serving node SGSN.

FIG. 2 shows a new third generation (3G) mobile communications system which is based e.g. on WCDMA (Wideband Code Division Multiple Access) technology. The 3G mobile communications system combines packet data transmission functionality with circuit switched communication. The serving node 3G SGSN corresponds to the serving node SGSN of the GPRS network, like the gateway node GGSN, which attends to connections with other packet data networks. Hereinafter in this application a serving node SGSN means the serving node of the 3G network. The mobile services switching centres 3G MSC attends to the routing of circuit switched traffic. The network may also be implemented without any mobile services switching centre 3G MSC. The subscriber information of mobile stations is stored permanently in home location register HLR and temporarily in visitor location register VLR located e.g. in connection with the mobile services switching centre, and in serving node SGSN. The radio network subsystem RNS includes a radio network controller RNC and at least one base station BS. The operation of the whole system is monitored by operation & maintenance system O&M.

In the third generation mobile communications system, the radio network subsystem must have information about mobile stations to be served over the radio interface, because the radio network subsystem allocates radio resources for the subscribers and it is able to combine both circuit switched and packet switched connections of the mobile station in the radio interface, using the same spreading code when e.g. WCDMA technology is used. It has been proposed that connections over the $I_u$ interface between the radio network and the main trunk should be connection-oriented due to the said combining and coding of circuit switched and packet switched traffic. In addition, a connection set-up to be made for the packet service allows advantageous transmission to the radio network subsystem of parameters describing the quality of the service (e.g. transmission rate, transmission delay). Without a connection set-up which takes place separately, these parameters must be added separately to each packet to be transmitted. A connection between the serving node and the radio network subsystem can be implemented e.g. with ATM in such a way that for each mobile station a virtual channel is reserved according to a certain ATM adaptation layer (e.g. ATM Adaptation Layer 5 AAL5 or ATM Adaptation Layer 2 AAL2).

In order to combine circuit switched and packet switched traffic in a radio network subsystem, it is preferable to unify the mobile station state management. For this reason, an idle state and an active state are proposed as mobility management (MM) states of the mobile station registered with the 3G network. These states differing from the GPRS system are also natural states, when the transmission of packet data between the serving node and the radio network is connection-oriented, as presented above. In the idle state, the mobile station is only able to listen to the broadcast of base stations and to move into an active state through a procedure to be described later in connection with FIG. 3. In the active state, the mobile station can transmit and receive data packets continuously. When the mobile station is in the active state, a communication connection has been set up between the serving node and the radio network and at least management resources are reserved for the mobile station in the radio network. Thus, each mobile station reserves network resources for use by itself in the active state. Of the presented 3G mobile communications system it is known to release limited radio resources during pauses in the packet data transmission, whereby the mobile station in the active state moves from the radio channel dedicated to the mobile station to a common radio channel, and the allocated radio resource can thus be released for other use. The connection between mobile station and base station is continued on the common channel, on which it is possible to transmit small data packets in both directions and to receive broadcast of the base station in the mobile station. When the packet data transmission is resumed, the radio network subsystem dedicates a new radio channel for the connection between base station and mobile station. The main trunk is not aware of this change of the used type of radio channel, so the mobile station's state remains active from the viewpoint of mobility management (MM).

FIG. 3 shows signalling between a mobile station and a 3G mobile communication network in the beginning of a packet data transmission. To keep it simple, the figure does not show any state-of-the-art signalling between the mobile station and the radio network subsystem for setting up e.g. connections of lower layers. In the Attach procedure 31, the serving node SGSN e.g. fetches subscriber information of the mobile station from the home location register. After this procedure, the mobile station is able to transmit and receive short messages (SMS) and to listen to the broadcast of base stations, but the mobile station is not able to transmit or receive packet data, because no packet data address is yet available to it. Hereby the mobile station is in the idle state. In PDP Context activation procedure 32, a packet data address is indicated to the mobile station, whereupon the mobile station will also be able to transmit and receive packet data. The mobile station has hereby moved into the active state. By the PDP Context activation procedure of the packet data protocol the mobile station is thus committed to a packet data address or to several addresses. Either the mobile station or the network can start this procedure. Before packet data is transmitted between the network and the mobile station, a connection-oriented communication connection is set up between serving node SGSN and radio network subsystem RNS by Bearer request/assignment procedure 33, wherein identifiers relating to the connection are transmitted, such as connection rate requirements and transmission delay requirements for the radio connection. After the communication connection has been set up between radio network subsystem RNS and serving node SGSN, it is possible to transmit packet data between the serving node SGSN and mobile station MS through radio network subsystem RNS (point 34).

In the operation of the third generation mobile communications system it is a problem as regards the transmission of packet data that resources of the transmission path between serving node SGSN and the radio network subsystem as well as memory resources of the radio network subsystem are reserved unnecessarily due to the burst-like character of packet data. Since a connection can be set up e.g. in the morning and end only in the evening, an address is reserved on the transmission path and connection management resources are reserved in the radio network subsystem for the whole day, even if no packets to be transmitted were to travel in the virtual circuit. Thus, a connection-oriented connection as described above for the serving node and the radio network subsystem consumes the transmission network's limited address space and the radio network subsystem's management resources.

SUMMARY OF THE INVENTION

The objective of this invention is to save limited address space of the transmission network and to save management resources of an access system.

This objective is achieved by a method and a communications system in accordance with the invention, which are characterized by that which is said in the independent claims. Advantageous embodiments of the invention are presented in the dependent claims.

The invention is based on the idea that the logical communication connection between the access network and the serving node of the trunk network is released while the data transmission is inoperative, and this communication connection is again set up, when transmission of user data begins. The communication connection between the access network and the serving node is released in such a way that the logical connection between the serving node and the terminal will remain. If said communication connection between the serving node and the access network was the terminal's last connection, the terminal will enter a 3 G idle state in accordance with the invention, which corresponds to the idle state of circuit switched services. While the communication connection is released in accordance with the invention, the terminal keeps the packet data address, whereby a packet data transmission can be started to and from the terminal. When the packet data transmission begins, a communication connection is again set up between the access network and the serving node. In a first embodiment of the invention, the communication connection is released when the inactivity of data transmission has lasted for a predetermined period of time.

It is an advantage of this kind of connection management that the limited address space of the transmission network is saved, when the addresses of inactive connections are freed for other use, and the management resources of the access system are saved.

BRIEF DESCRIPTION OF THE DRAWINGS

The invention will now be described in connection with advantageous embodiments and referring to the examples shown in FIGS. 4–10 in the appended drawings, wherein.

DETAILED DESCRIPTION OF THE INVENTION

Figure 1:
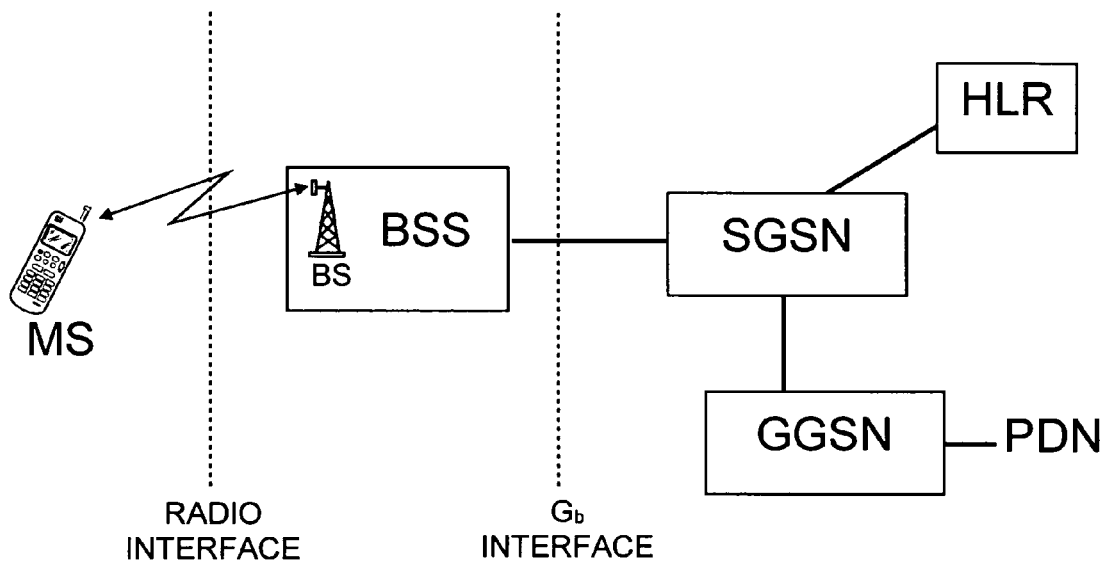
FIG. 1 is a block diagram of the GPRS system.
Figure 2:
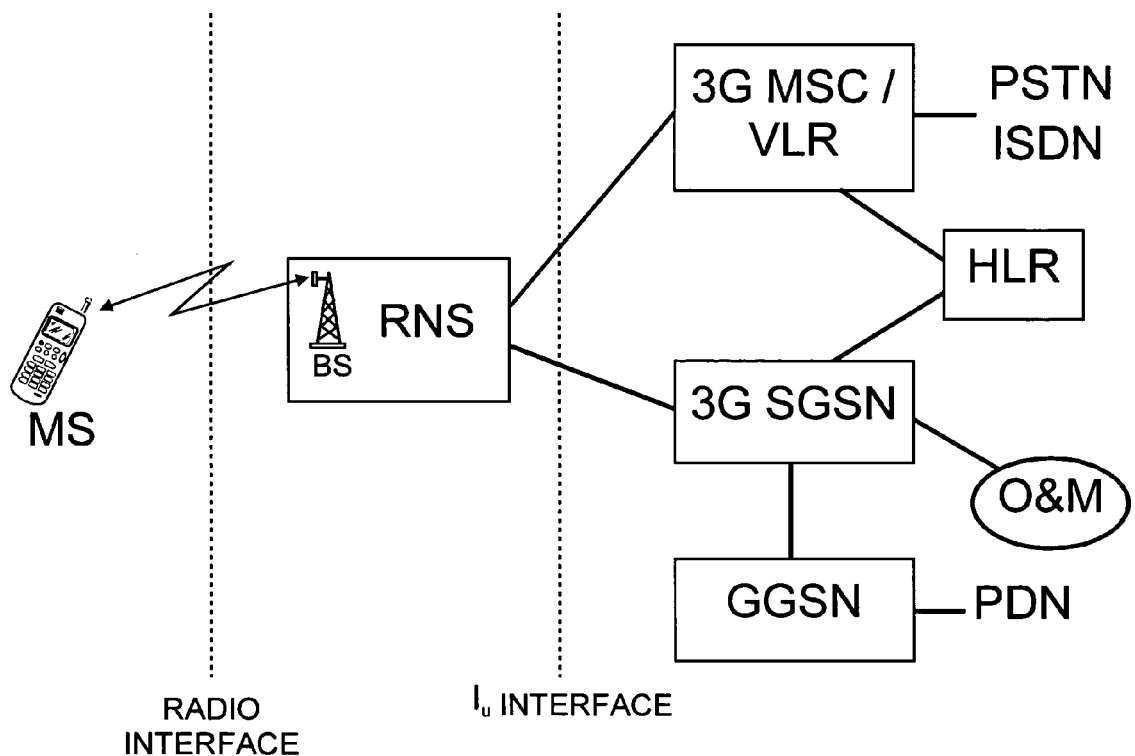
FIG. 2 shows such parts of the 3G mobile communications system which are essential for the invention.

The present invention can be applied in connection with any suitable communications system. Hereinafter the invention is described more closely by way of example mainly in connection with a digital 3G mobile communications system with the focus on that part of the system which is intended for packet data transmission. FIG. 2 shows the simplified structure of a 3G network which was described earlier.

Figure 4:
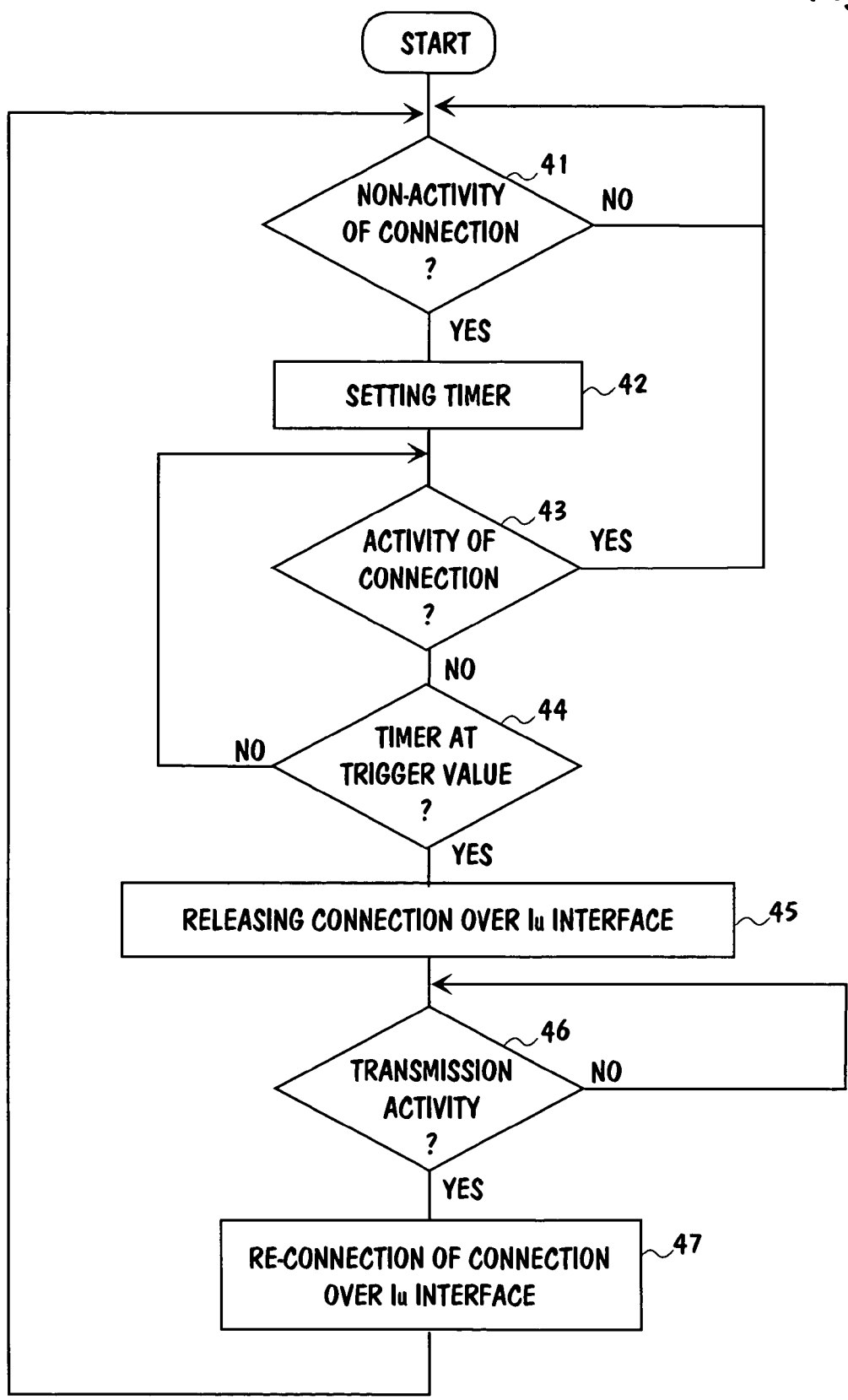
FIG. 4 is a flow chart of a first embodiment of the method according to the invention.

In the following, the invention will be described in greater detail in the light of a first embodiment of the invention. FIG. 4 is a flow chart of a first embodiment of the method according to the invention, wherein the idleness, that is, the non-activity of a mobile connection is measured by using a timer. At stage 41 a check is made of the non-activity of the user data traffic of a mobile station's communication connection. If no user data is transmitted on the connection, a timer is set at stage 42 at some suitable value, e.g. at zero or at a certain value, and the timer is started. Alternatively, the check at stage 41 can be left out, if the timer is always set and started after transmission and/or reception of a data packet. At stage 43 a check is made to see if the idleness of the connection continues. If user data is transmitted on the connection, the process returns to stage 41 to monitor the beginning of the idleness of the connection. If the connection is found to be idle in the check made at stage 43, a check is made at stage 44 to see if the timer has achieved the pre-set trigger value. Such a trigger value may be e.g. zero or some suitable value. If the timer has not yet achieved the trigger value, monitoring of the continued idleness of the connection goes on at stage 43. If the timer has achieved the trigger value at stage 44, the mobile station's communication connection between the radio network and the serving node is disconnected at stage 45, and management resources are possibly made free in the radio network, e.g. such records relating to the mobile station that may include information on transmission rate and transmission delay requirements of the service or on frame lengths and spreading codes to be used at the radio interface. If one or more circuit switched connection events are taking place at the same time in the mobile station through the mobile services switching centre MSC, the disconnection of the communication connection started by the serving node SGSN will of course not affect the concerned circuit switched connection events. The user data's need for switching is checked at stage 46. When a need occurs to switch user data from the network to the mobile station or from the mobile station to the network, a communication connection is re-established (stage 47). After reestablishment of the connection, the process moves to the beginning of the flow chart to monitor the beginning of a new idleness period of the connection.

Figure 3:
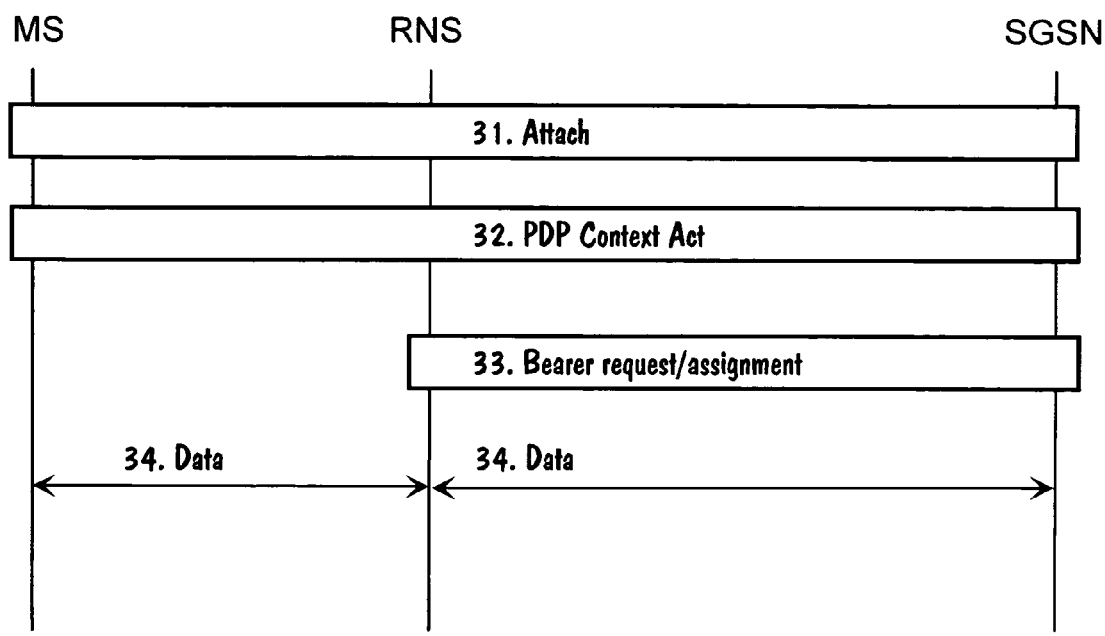
FIG. 3 is a signalling diagram of the setting up of a packet data connection in the 3G mobile communications system.
Figure 5:
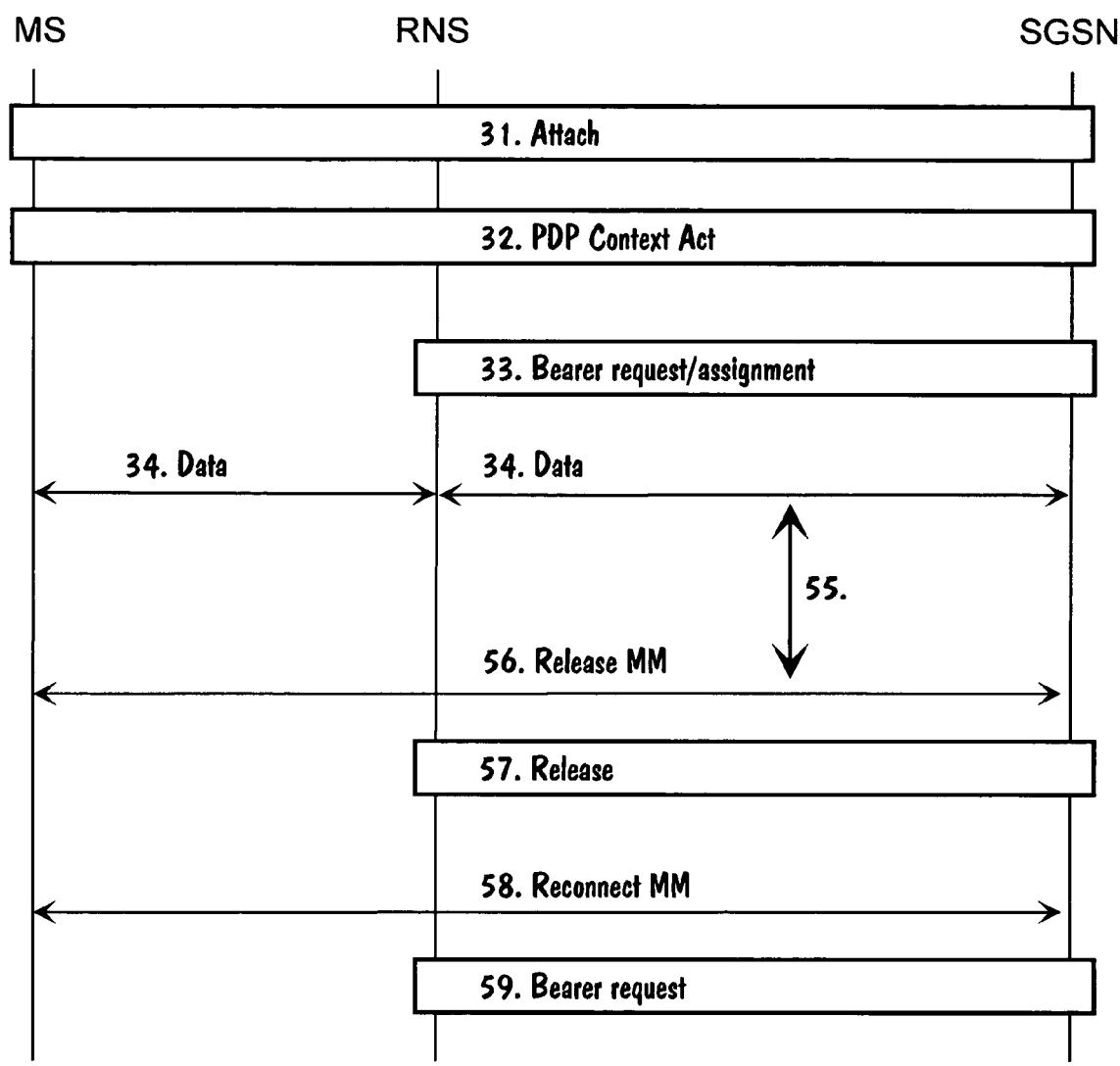
FIG. 5 is a signalling diagram of the connection management according to the invention.

FIG. 5 is a signalling diagram of the first embodiment of the invention. For the sake of simplicity, the figure does not show any such state-of-the-art signalling between the mobile station and the radio network subsystem, by which e.g. lower layer connections are set up. The procedures of stages 31–33 are carried out in a state-of-the-art manner, as was described earlier in connection with FIG. 3. At stage 34 user data is switched in a state-of-the-art manner between mobile station MS and the serving node SGSN through the radio network subsystem RNS. Upon completion of the transmission of user data at stage 34 or in connection with transmission/reception of a data packet, the timer is set and it is started for the time of the idleness period of the mobile station's communication connection between the RNS and the SGSN (stage 55). If the idleness period goes on for a pre-established trigger value, signalling takes place between the mobile station MS and the serving node SGSN concerning temporary release of the MM layer in a Release MM procedure 56. The procedure 56 is not needed, if both the network and the mobile station have a timer and the timers are synchronised with each other. After the triggering off of the timer or the performance of the Release MM procedure, disconnection takes place at stage 57 of the mobile station's communication connection between the radio network subsystem and the serving node, and management resources are possible made free in the radio network. The connection is disconnected as regards user data and signalling, or only as regards user data. The described temporary release of the MM layer will take place in case only one communication connection existed for the mobile station between the radio network and the serving node. If, on the other hand, the mobile station has several simultaneous communication connections between the radio network and the serving node, the Release MM procedure will not cause release of the MM layer, but the process goes on from stage 57 with a disconnection of the mobile station's communication connection. When a need occurs for switching of user data, re-establishment of the connection is signalled between mobile station MS and the serving node SGSN in a Reconnect MM procedure 58. The connection between radio network subsystem RNS and the serving node SGSN is re-established by a Bearer request procedure 59 known as such in the state of the art. The reconnect signalling 58 of the connection can be started either by mobile station MS or by the serving node SGSN, depending on the direction in which user data is relayed. In a state-of-the-art manner the packet is relayed at the radio interface from the base transceiver station to the mobile station MS using already reserved radio resources, or after the reservation of radio resources started by the call procedure or the mobile station, depending on the state of radio resources.

In the first embodiment of the invention, the timer and the trigger value can be set e.g. in such a way that disconnection of the connection is started after a ten-minute idleness period. The idleness period starting disconnection of the connection according to the invention can be set individually for the different connections, e.g. at some value between 1 and 10 minutes. In addition, the control of the timer's setting value may also depend on the subscribed service class. The timer may be located on the network side, preferably in connection with the serving node SGSN, or/and on the mobile station side. In the PDP Context activation procedure at stage 32 in FIG. 5 it is also possible in accordance with the invention to negotiate about the timer's trigger value, if required. Alternatively, negotiation about the trigger value may take place in connection with some other SM level procedure, when required, such as PDP Context modification or PDP Context deactivation, or the trigger value can be stated on the broadcast channel of the base station. It is not necessary to make the trigger value known to the mobile station.

Figure 6:
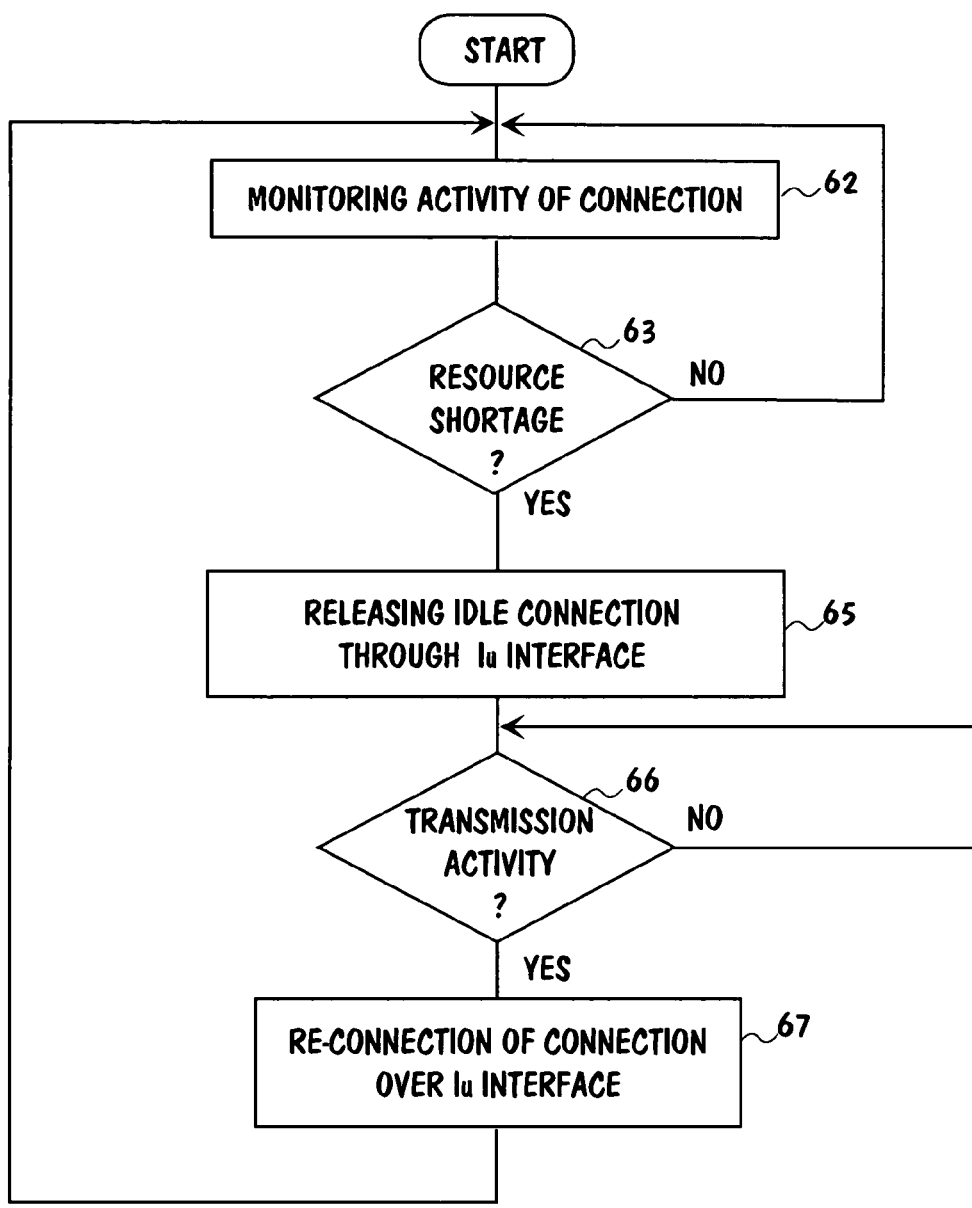
FIG. 6 is a flow chart of a second embodiment of the method according to the invention.

In the second embodiment of the invention, disconnection of the connection between the radio network subsystem and the serving node SGSN is triggered off by a shortness of resources at the $I_u$ interface. In the second embodiment of the invention, traffic monitoring is performed in the network in the same way as was described above in connection with the first embodiment of the invention. FIG. 6 is a flow chart of a method according to the second embodiment of the invention. At stage 62 the activity of the mobile station's connection is monitored. At stage 63 the shortness of resources of the $I_u$ interface between the radio network and the serving node is monitored. Alternatively, the sufficiency of resources can be checked in connection with the establishment of a new connection. If there are sufficient resources, the process returns to stage 62 to check the connection's activity. If there is a shortness of resources, the idle connection over the $I_u$ interface is disconnected (stage 65), whereby the address used on the connection will be made free for other use. Such a connection is preferably disconnected, which has been non-active for the longest time or which has a low priority in relation to the other connections. At stage 66 a check is made of the need for switching of user data of the disconnected connection. When a need to switch user data occurs, the connection over the $I_u$ interface is reconnected (stage 67). After reconnection of the connection, the process returns to the beginning of the flow chart to monitor the activity of the connection.

In a first manner of implementation of the third embodiment of the invention, the radio network subsystem RNS can prevent disconnection of a connection over the $I_u$ interface. Such a functionality may be needed e.g. in a situation where a mobile station has transmitted to the radio network a data packet, which the radio network subsystem has received, but of the relaying of which the serving node does not yet know. When the SM protocol starts releasing resources of the $I_u$ connection in accordance with the invention by the Release procedure 57 of FIG. 5, RNS notifies SGSN that it does not accept the release. E.g. a 'data arriving' reason code or such may be attached to the notification. Hereby disconnection of the connection is interrupted and it is possible to relay the data packet to the serving node. In this embodiment, the MM mobility management state is preferably changed from the active to the 3G idle state only after the disconnection of the $I_u$ connection, so that the interrupted disconnection of the connection will not cause any change in the MM state. Otherwise, the functionality of this embodiment is similar e.g. to the functionality of the first or second embodiment described above or to a combination of the first and second embodiment.

In a second manner of implementation of the third embodiment of the invention, MS does not accept a change of the MM mobility management state to the active state as commanded by the serving node SGSN. Such a functionality may be needed e.g. in a situation where a mobile station has transmitted a data packet, of the switching of which the serving node, however, does not yet know. Hereby the SM protocol will not start any release of resources of the $I_u$ connection.

In a third manner of implementation of the third embodiment of the invention, the serving node SGSN does not accept the change of the MM mobility management state to an idle state from an active state as commanded by the mobile station MS. Such a functionality may be needed e.g. in a situation, where the serving node has transmitted a data packet, of the switching of which the mobile station, however, does not yet know. Hereby the SM protocol will not start any release of the resources of the $I_u$ connection.

Figure 7:
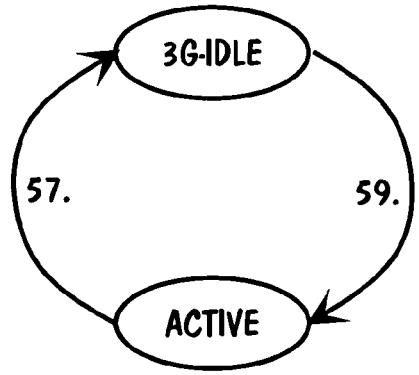
FIG. 7 shows changes in state caused by the connection management according to the invention.

FIG. 7 shows a change of the MM state of the connection as a result of the connection management according to the invention. The mobile connection, which has been changed into the active state in accordance with the state of the art, will go into the 3G idle state in accordance with the invention after the disconnection of the connection at stage 57 of FIG. 5. From the 3G idle state the connection goes back to the active state e.g. after the re-establishment of the connection in accordance with stage 59 of FIG. 5. A performance of a state-of-the-art PDP Context activation procedure will also return the mobile connection to the active state. Both states, the active state and the 3G idle state, keep the context active in the network.

Figure 8:
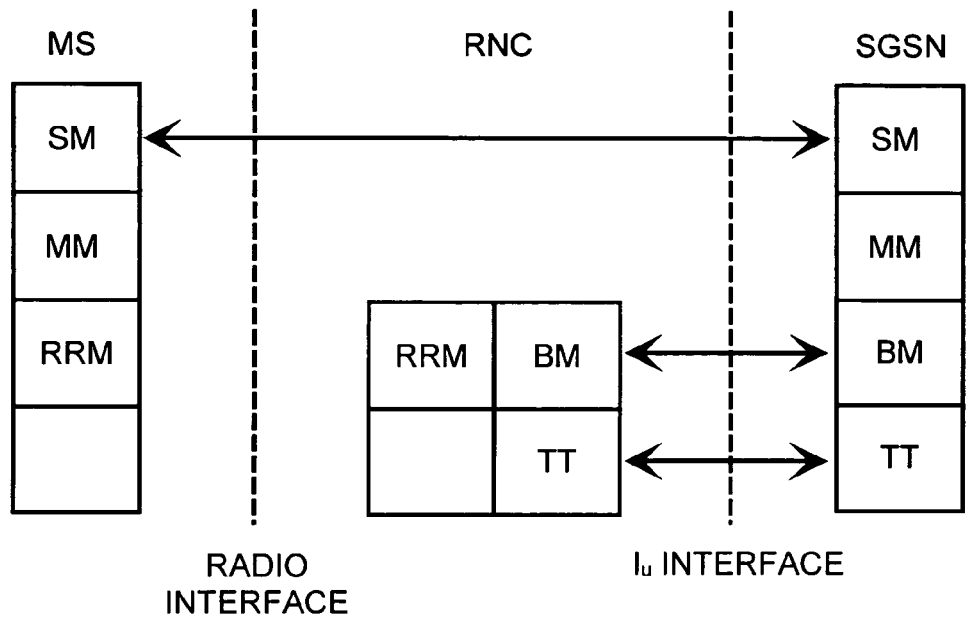
FIG. 8 shows the connection management according to the invention as a theoretical layer description.

FIG. 8 shows a theoretical layer description of a connection in accordance with the invention, wherein protocols, which have the same names and which belong to units connected with one another, are communicating with each other. Of the protocols shown in the figure, the SM (Session management) performs session management, and the state-of-the-art SM-procedures relating to this are e.g. PDP Context activation, PDP Context modification and PDP Context deactivation. The MM (Mobility Management) protocol performs management of the mobile station's location and state. A state-of-the-art MM procedure is e.g. location update. According to the invention, new functions are performed for the upper level protocol, in the case shown as an example in FIG. 8 for the SM level protocol, such as traffic monitoring and, based on this, temporary disconnection of the MM connection, that is, management of the $I_u$ interface. SM level procedures in accordance with the invention are the Release MM procedure 56 and the Reconnect MM procedure 58 of FIG. 5. Lower level BM (Bearer Management) and RRM (Radio Resource Management) protocols attend to management of the transmission connection, while the TT (Transmission & Transport) protocol attends to management of the physical layer. The Release procedure 57 and Bearer request procedure 59 in accordance with the invention which are known as such are in accordance with the Bearer Management protocol. After disconnection of the connection over the $I_u$ interface in accordance with the invention, there is no MM layer or lower level connection from the serving node, but there is an upper SM (Session Management) level connection to the mobile station. The disconnection of the BM connection over the $I_u$ interface automatically also brings about a disconnection of the TT connection. During the release of $I_u$ resources in accordance with the invention a location update is performed in a state-of-the-art manner on the signalling connection without re-establishment of the $I_u$ connection.

Figure 9:
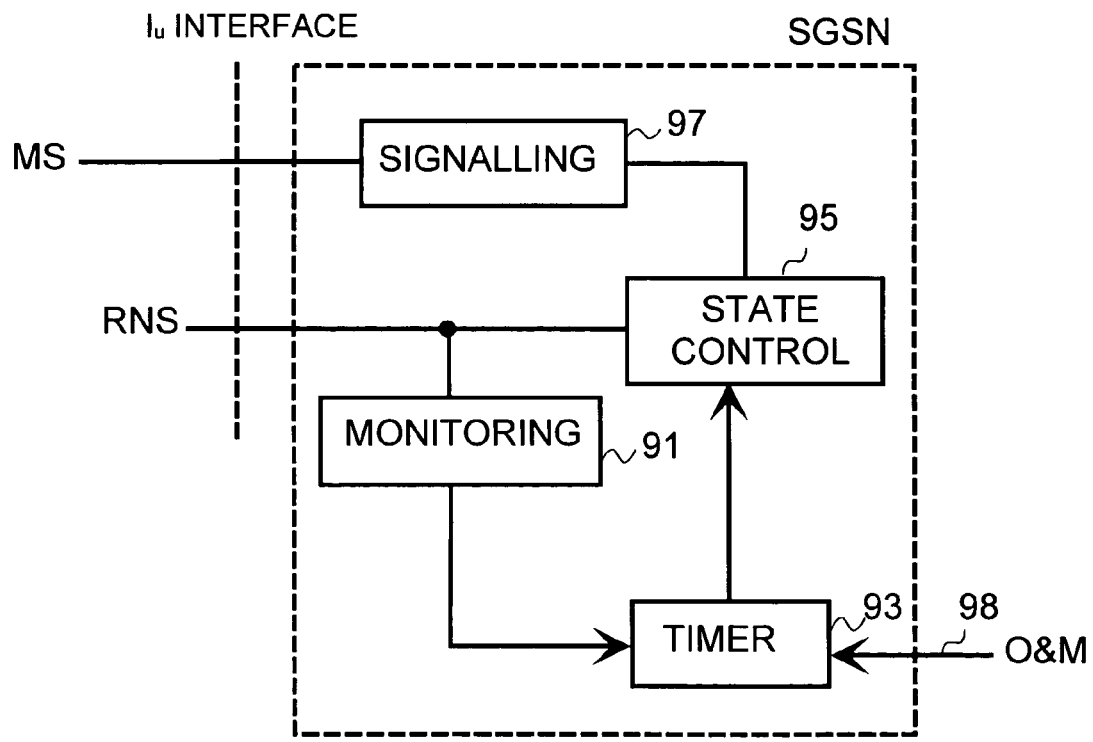
FIG. 9 is a block diagram of parts essential to the invention in a mobile communications system according to a first embodiment of the invention.

FIG. 9 is a block diagram of a first embodiment of a mobile communications system implementing connection management in accordance with the invention as regards the units which are essential to the invention. The figure shows that connection management equipment of a mobile communications system according to the invention which performs disconnection of a logical communication connection between a serving node SGSN and a radio network subsystem RNS during idleness of the connection and reconnection of this communication connection when the traffic activity starts. The connection management equipment is preferably located in connection with the serving node SGSN, as is shown in FIG. 9, and/or partly in connection with the mobile station. The connection management equipment includes monitoring equipment 91 for identifying the activity and non-activity of user data traffic on the mobile station's communication connection, a timer 93 responsive to this monitoring equipment for measuring uninterrupted non-activity in the relaying of user data and state control equipment 95 for releasing the logical communication connection between the serving node SGSN and the radio network subsystem RNS, when a preset time has passed as measured by the timer, and for reconnection of the logical communication connection between the serving node SGSN and the radio network subsystem RNS as the relaying of user data resumes. The control 98 of the timer's setting values is obtained from elsewhere in the network, e.g. as established by the operator from an operation and management system (O&M). The connection management equipment may also include signalling equipment 97, which is used for signalling information between the serving node SGSN and the mobile station MS on release of the logical communication connection and/or on the need for its reconnection.

Figure 10:
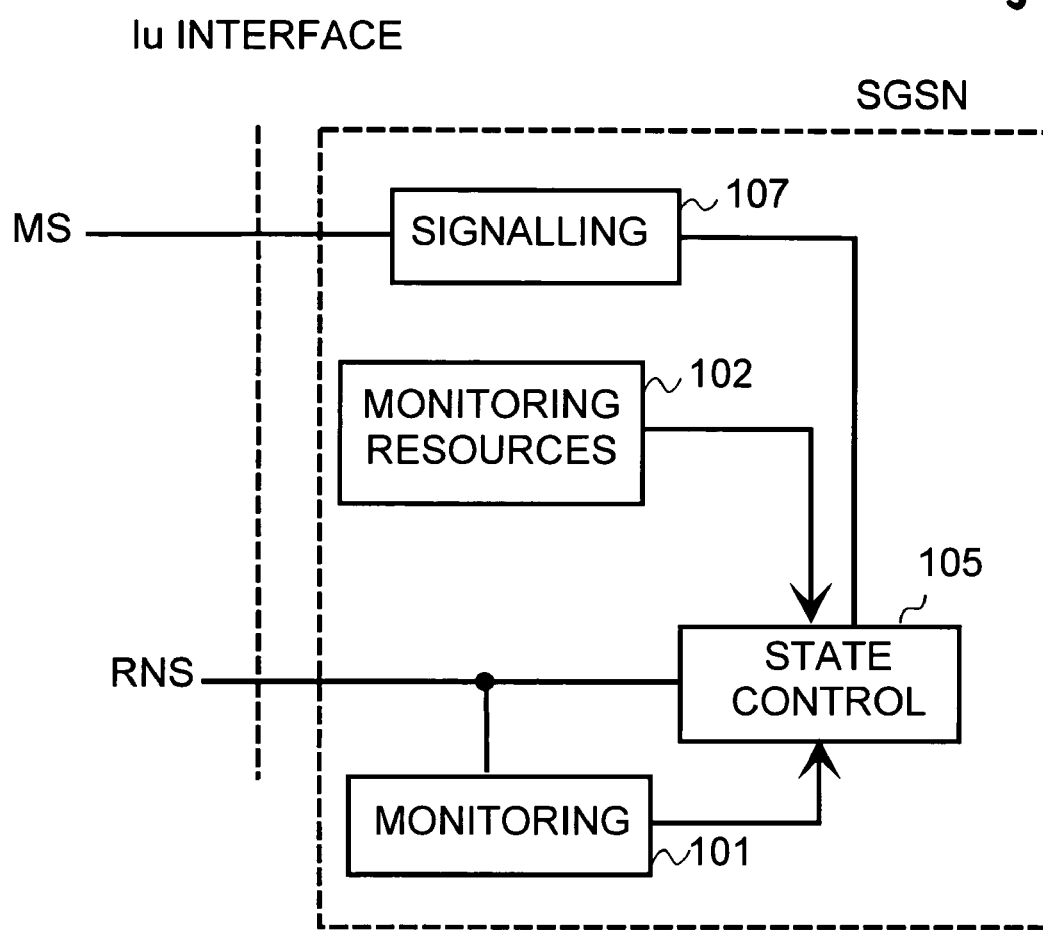
FIG. 10 is a block diagram of parts essential to the invention in a mobile communications system according to a second embodiment of the invention.

FIG. 10 is a block diagram of a second embodiment of the mobile communications system according to the invention as regards the units which are essential to the invention. The connection management equipment is preferably located in connection with the serving node SGSN, as is shown in FIG. 10, and/or partly in connection with the mobile station. In the second embodiment of the invention, the connection management equipment includes monitoring equipment 101 for identifying the activity and non-activity of user data traffic on the mobile station's communication connection, resources monitoring equipment 102 for monitoring vacant or busy connection identifiers of the connections between the serving node SGSN and the radio network subsystem RNS and state control equipment 105 for releasing the logical communication connection between the serving node SGSN and the radio network subsystem RNS, when as indicated by the resources monitoring equipment 102 there is a lack of connection identifiers and when the connection is idle as indicated by the monitoring equipment 101, and for reconnecting the logical connection between the serving node SGSN and the radio network subsystem RNS as the relaying of user data resumes. The resources monitoring equipment 102 monitors the use of connection identifiers of the transmission network's connections. The connection management equipment may also include signalling equipment 107, which are used for signalling information between the serving node SGSN and the mobile station MS on release of the logical connection and/or on a need for its reconnection.

The drawings and the relating explanation and the names of procedures occurring therein are only intended to illustrate the inventive idea. As regards its details the connection management according to the invention may vary within the scope defined by the claims. Although the invention was described above mainly in connection with a 3G mobile system implemented with WCDMA technology, the invention may also be used for some other kind of mobile system, e.g. for a system implemented with TD-CDMA technology. The invention is also suitable for use with the type of connectionless connection existing between a trunk network and a radio network, e.g. in a Frame Relay case. The radio network mentioned in this application may be e.g. UTRAN (UMTS Terrestrial Radio Access Network).

The invention claimed is:

1. A method of connection management in a communications system, which is suitable for packet switched data transmission and which includes at least one serving node, at least one access system and terminals, said communications system being adapted for having a first logical connection relating to a terminal between the serving node and the access system and a second, upper-level logical connection relating to the terminal between the terminal and the serving node, the method comprising the steps of:
    releasing the first logical connection between the serving node and the access system when the first logical connection is inactive, so that the second logical connection remains between the serving node and the terminal; and
    reconnecting the first logical connection between the serving node and the access system when transmission of user data begins.

2. The method of claim 1, wherein the first logical connection is released between the serving node and the access system, when terminal's communications on the first logical connection have been idle for a pre-established time.

3. The method of claim 2, wherein the pre-established time is set for the connection based on the service class.

4. The method of claim 1, wherein the first logical connection is released between the serving node and the access system, when a shortage of resources occurs on this transmission distance and the first connection is idle.

5. The method of claim 1, wherein information on release of the first logical connection is signaled between the serving node and the terminal.

6. The method of claim 1, wherein information on the need for reconnection of the first logical connection is signaled between the serving node and the terminal.

7. The method of claim 1, further comprising the step of:
    preventing the release of the first logical connection between the serving node and the access system, when some unit in the communications system has such user data, which is intended for relaying over this connection.

8. The method of claim 1, wherein the communications system is a mobile communications system.

9. The method of claim 8, wherein the connection of the mobility management protocol is released between the serving node and the access system, so that the connection of the upper level connection protocol between the serving node and the terminal remains.

10. A communications system, which is suitable for packet switched data transmission and which includes at least one serving node, at least one access system and terminals, said communications system being adapted for having a first logical connection relating to a terminal between the serving node and the access system and a second, upper-level logical connection relating to the terminal between the terminal and the serving node, the communications system comprising connection management equipment for releasing the first logical connection between the serving node and the access system during data transmission non-activity relating to the first logical connection so that the second logical connection remains between the serving node and the terminal and for reconnecting this first logical connection, when traffic activity starts.

11. The communications system of claim 10, wherein the connection management equipment comprises:

monitoring equipment for identifying activity and non-activity of the user data traffic on the terminal's communication connection;

at least one timer for measuring an uninterrupted non-activity period in the relaying of user data; and state control equipment for releasing the first logical connection between the serving node and the access system, when a pre-established time has passed as measured by the timer, and for reconnecting the first logical connection between the serving node and the access system, when the relaying of user data resumes.

12. The communications system of claim 11, wherein an operation and management system controls setting of the timer.

13. The communications system of claim 11, wherein the timer's setting depends on the service class.

14. The communications system of claim 10, the connection management equipment further comprising:

resources monitoring equipment for monitoring the degree of reservation of the connection identifiers of connections between the serving node and the access system.

15. The communications system of claim 10, wherein the connection management equipment comprises:

monitoring equipment for identifying activity and non-activity of the user data traffic on the terminal's first connection;

resources monitoring equipment for monitoring the degree of reservation of the connection identifiers of connections between the serving node and the access system; and state control equipment for releasing the first logical connection between the serving node and the access system, when there is a shortage of connection identifiers and the connection is idle, and for reconnecting the first logical connection between the serving node and the access system, when relaying of user data resumes.

16. The communications system of claim 10, the connection management equipment also comprising signaling equipment for signaling of release and reconnection of the first logical connection between the serving node and the terminal.

17. The communications system of claim 10, wherein the access system is a radio network subsystem.

18. The communications system of claim 10, wherein the terminal is a mobile station.

* * * * *